(12) United States Patent
Nam et al.

(10) Patent No.: US 8,538,614 B1
(45) Date of Patent: Sep. 17, 2013

(54) RECHARGEABLE BATTERY SYSTEMS AND METHODS

(75) Inventors: Ki Y. Nam, Newport Beach, CA (US); Kenneth Tien Cao, Laguna Niguel, CA (US)

(73) Assignee: T3 Motion, Inc., Costa Mesa, CA (US)

( * ) Notice: Subject to any disclaimer, the term of this patent is extended or adjusted under 35 U.S.C. 154(b) by 274 days.

(21) Appl. No.: 12/962,388

(22) Filed: Dec. 7, 2010

Related U.S. Application Data

(60) Provisional application No. 61/267,360, filed on Dec. 7, 2009.

(51) Int. Cl.
*B60L 9/00* (2006.01)

(52) U.S. Cl.
USPC .......................................................... 701/22

(58) Field of Classification Search
None
See application file for complete search history.

(56) References Cited

U.S. PATENT DOCUMENTS

| | | | | |
|---|---|---|---|---|
| 5,656,915 | A * | 8/1997 | Eaves | 320/118 |
| 5,659,237 | A * | 8/1997 | Divan et al. | 320/119 |
| 6,100,663 | A * | 8/2000 | Boys et al. | 320/108 |
| 2008/0050645 | A1* | 2/2008 | Kai et al. | 429/61 |
| 2008/0231236 | A1* | 9/2008 | Watanabe et al. | 320/150 |

\* cited by examiner

*Primary Examiner* — Thomas Tarcza
*Assistant Examiner* — Adam Alharbi
(74) *Attorney, Agent, or Firm* — Blakely Sokoloff Taylor & Zafman LLP

(57) ABSTRACT

Rechargeable battery systems and methods having a plurality of power modules and a battery management system. The power modules each plug into the battery management system and each include cell state sensing and communication capabilities as well as individual cell charging capabilities. The battery management system monitors the state of the power modules and enables the chargers in the power modules as necessary and as allowed by the limits of the source of charging power. In a vehicle, the battery management system also may override or limit the vehicle capabilities based on state of charge of the batteries. Various other features are disclosed.

17 Claims, 9 Drawing Sheets

RECHARGEABLE BATTERY SYSTEMS AND METHODS

CROSS-REFERENCE TO RELATED APPLICATIONS

This application claims the benefit of U.S. Provisional Patent Application No. 61/267,360 filed Dec. 7, 2009.

BACKGROUND OF THE INVENTION

1. Field of the Invention

The present invention relates to the field of rechargeable battery systems such as may be used in battery powered vehicles and the like.

2. Prior Art

Rechargeable battery packs of substantial size are now commonly used for various applications, such as by way of example, for powering battery powered vehicles. Such battery packs generally consist of a plurality of batteries connected in series to provide battery current at a relatively high voltage. Such a battery bank is shown schematically in FIG. 1, wherein each battery cell 20 has a pair of terminals 22 and 24, the battery bank shown being comprised of a battery bank of 16 battery cells wide by 6 battery cells deep, for a total of 64 battery cells.

An overall prior art system incorporating a battery pack as shown in FIG. 1 may be seen in FIG. 2. A battery management system is typically coupled to an LCD (liquid crystal display) for displaying information regarding the battery pack condition and state of charge. The battery management system is powered from a 115 VAC input when the system is plugged in, so to speak, and otherwise is powered from the DC power of the battery pack itself. The battery management system monitors and controls a battery charger also powered from the 115 VAC input through a communication link, with the main high voltage charger charging all of the battery cells in the battery pack. The communication link and control is coupled to each battery cell so that the condition (state of charge and general health) of each battery cell in the battery pack may be monitored to detect which battery cells most seriously need charging and whether any battery cells in the battery pack will not satisfactorily charge or tend to overheat. Battery cell balancing is also included in this prior art.

The prior art system of FIGS. 1 and 2 works well when all battery cells are in good condition and the terminal voltage of the batteries in the battery pack is well balanced. However, if a single battery cell in the battery pack fails, the entire battery pack must be disassembled, the bad battery cell replaced and the battery pack rebalanced before the battery system may be used again. Consequently, in the prior art whenever a bad battery cell is encountered, the entire battery pack must be serviced before it can be recharged, making the failure of a single battery cell a catastrophic failure for the battery system.

DETAILED DESCRIPTION OF THE PREFERRED EMBODIMENTS

Figure 2:
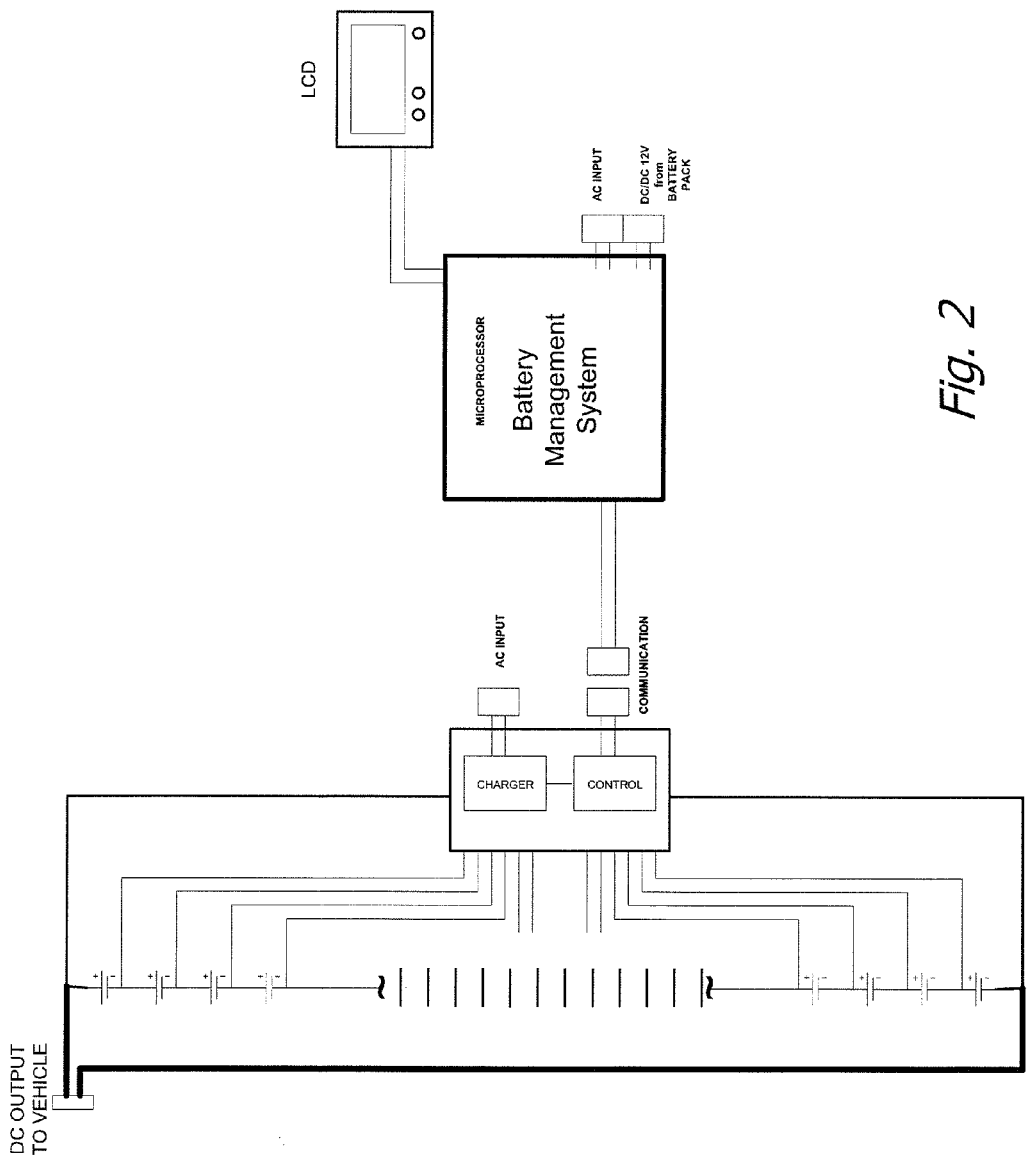
FIG. 2 is a block diagram of a conventional battery stack and power management system in accordance with the prior art.
Figure 3:
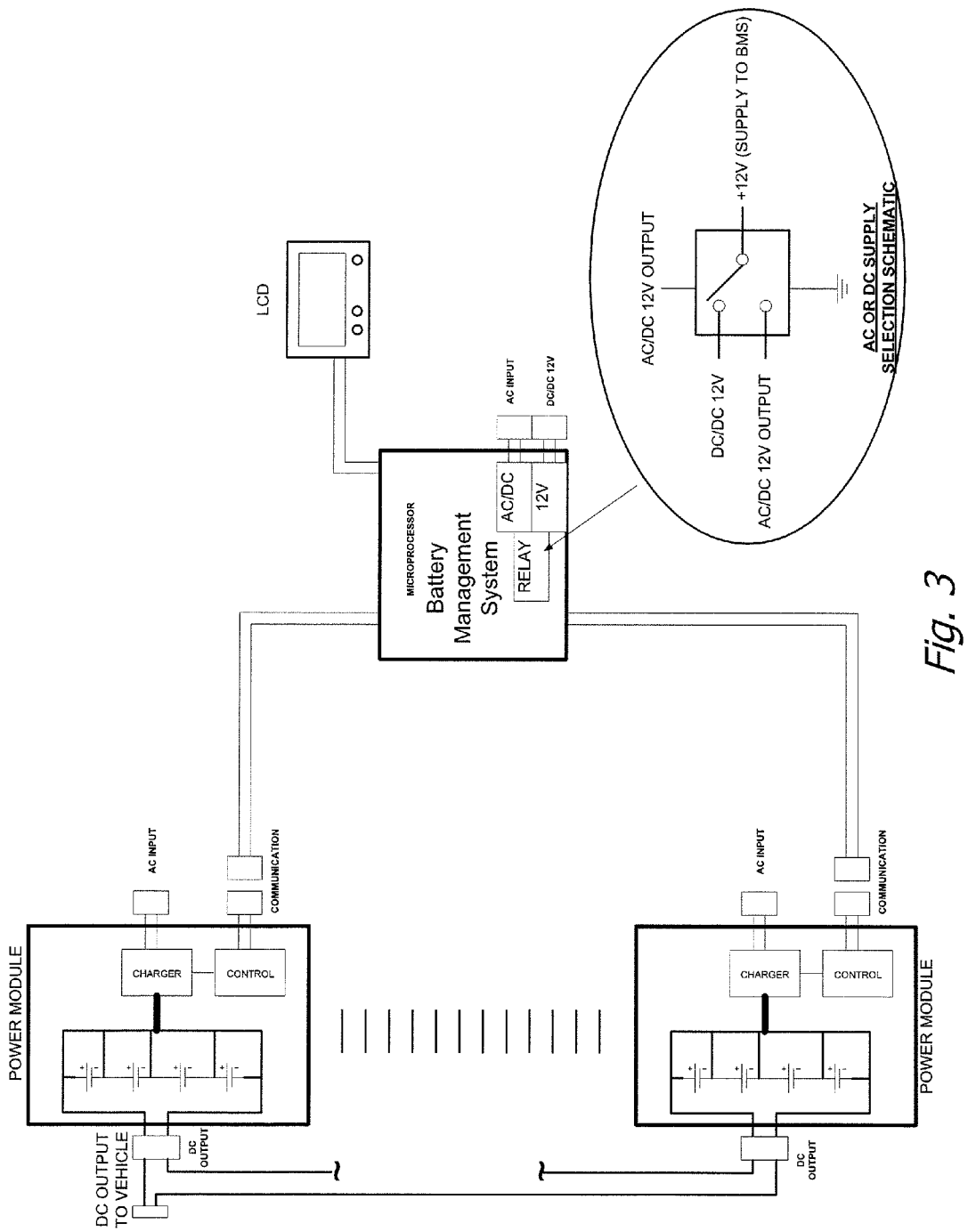
FIG. 3 is a block diagram of a battery stack and power management system in accordance with one embodiment of the present invention.

Now referring to FIG. 3, a block diagram of one embodiment of the present invention may be seen. In this embodiment a microprocessor based battery management system is used which has some aspects similar to the prior art battery management system shown in FIG. 2. In particular, the battery management system of FIG. 3 will operate on 115 VAC, when available, and otherwise will operate on a DC to DC converter converting the voltage on the battery stack to 12 volts. Also the battery management system has a communication system to communicate with each battery set (power module) to determine its state of charge and to control the charging of each battery cell. However, unlike the prior art, each battery set (in the embodiment shown having four cells) is contained within a power module which further includes a low power equalizer charger for that power module, as well as a control unit for controlling the charger, sensing battery conditions and communicating with the battery management system. The charger in each power module is AC powered, with all AC inputs to the chargers and the battery management system being coupled in parallel so that a single plug may be used to power the system when AC power is available.

Figure 1:
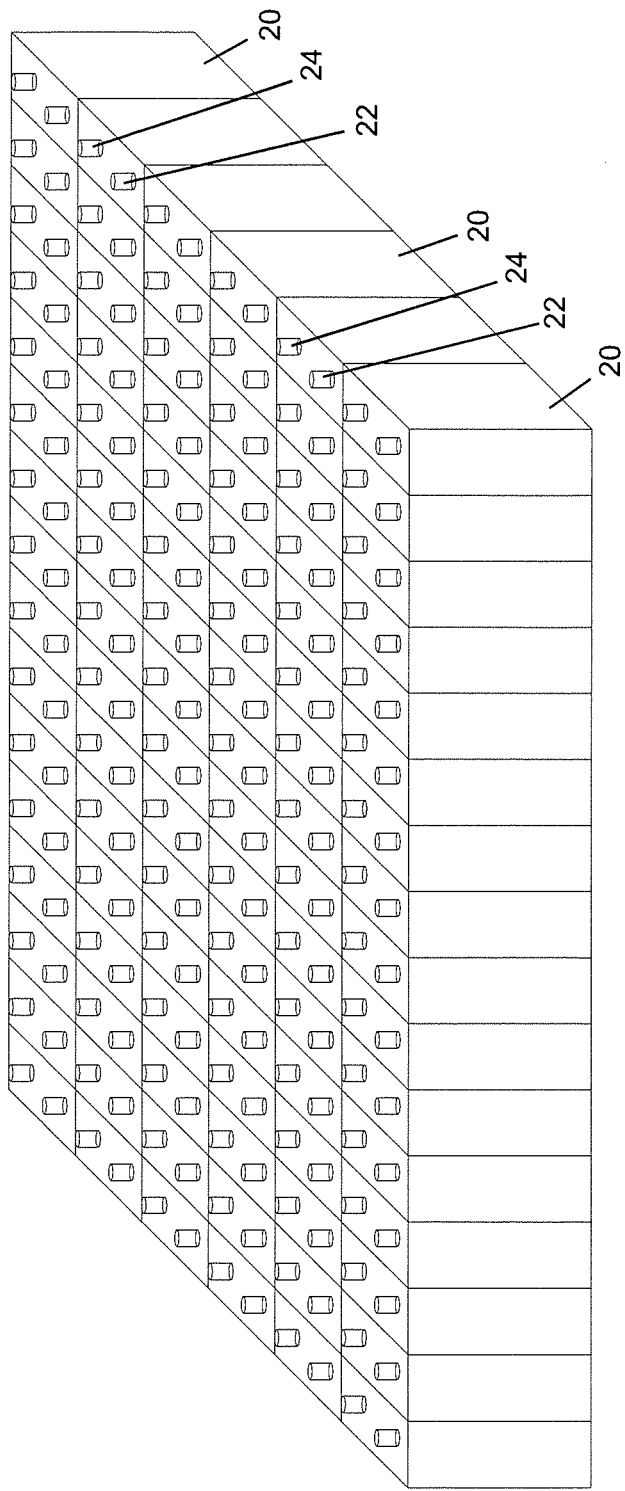
FIG. 1 schematically illustrates a conventional prior art battery stack as commonly used in battery powered vehicles and hybrid vehicles.

The power modules normally are connected in series, like the batteries in the battery pack of FIG. 1, so that the voltages of the battery packs are additive. This is no problem, however, as the AC input to the charger in each power module will be transformer coupled through a step-down transformer to power the charger circuit so that the output side of the charger is effectively floating with respect to the AC input, allowing any power module to be positioned at any location in the power module stack.

Figure 4B:
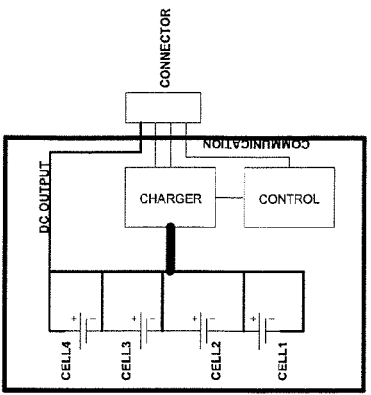
FIG. 4 illustrates the mechanical design of a battery in accordance with one embodiment of the present invention.
Figure 4A:
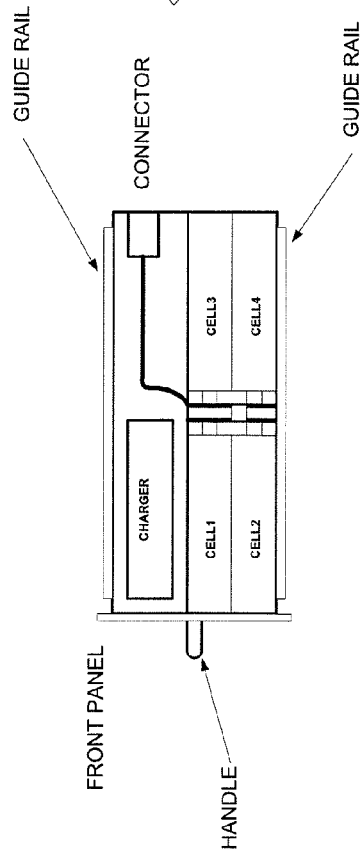
Figure 4D:
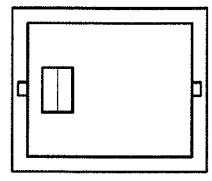
Figure 4E:
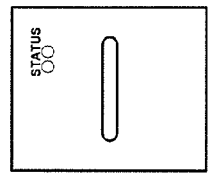
Figure 4C:
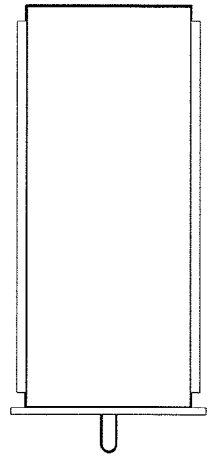

Now referring to FIGS. 4a through 4e, further details of the power module schematically shown in FIG. 3 may be seen. FIG. 4a presents a power module schematic showing the charger control and DC output all connected to the same connector. This connector is a special connector in that the DC output connector contacts must be capable of a high current, the charger input is a much higher voltage though much lower current than the DC output, and the signals to and from the control are simply signal level voltages and currents. As may be seen in FIG. 4b, the four cells of the battery are generally packaged below the charger, with the connector being on a rear panel and the handle being on a front panel of the power module. The charger in each power module is coupled to each cell within the power module and may charge any one or more of the cells in that power module in accordance with the cells charging needs. FIG. 4c is a side view of the power module and FIG. 4d is a front view showing a pair of status lights (LEDs) on the front panel, indicative of the state of charge of the power module and whether the same is charging. Obviously a different number of status LEDs might be used, and if desired, a push button switch may be provided to activate the status LEDs so that the LEDs are not always on, or alternatively, the status lights might be made active only when the system is plugged into 115 VAC power. Finally, FIG. 4e shows a rear view of the power module, illustrating the connector of FIGS. 4a and 4b.

Figures 5A, 5B:
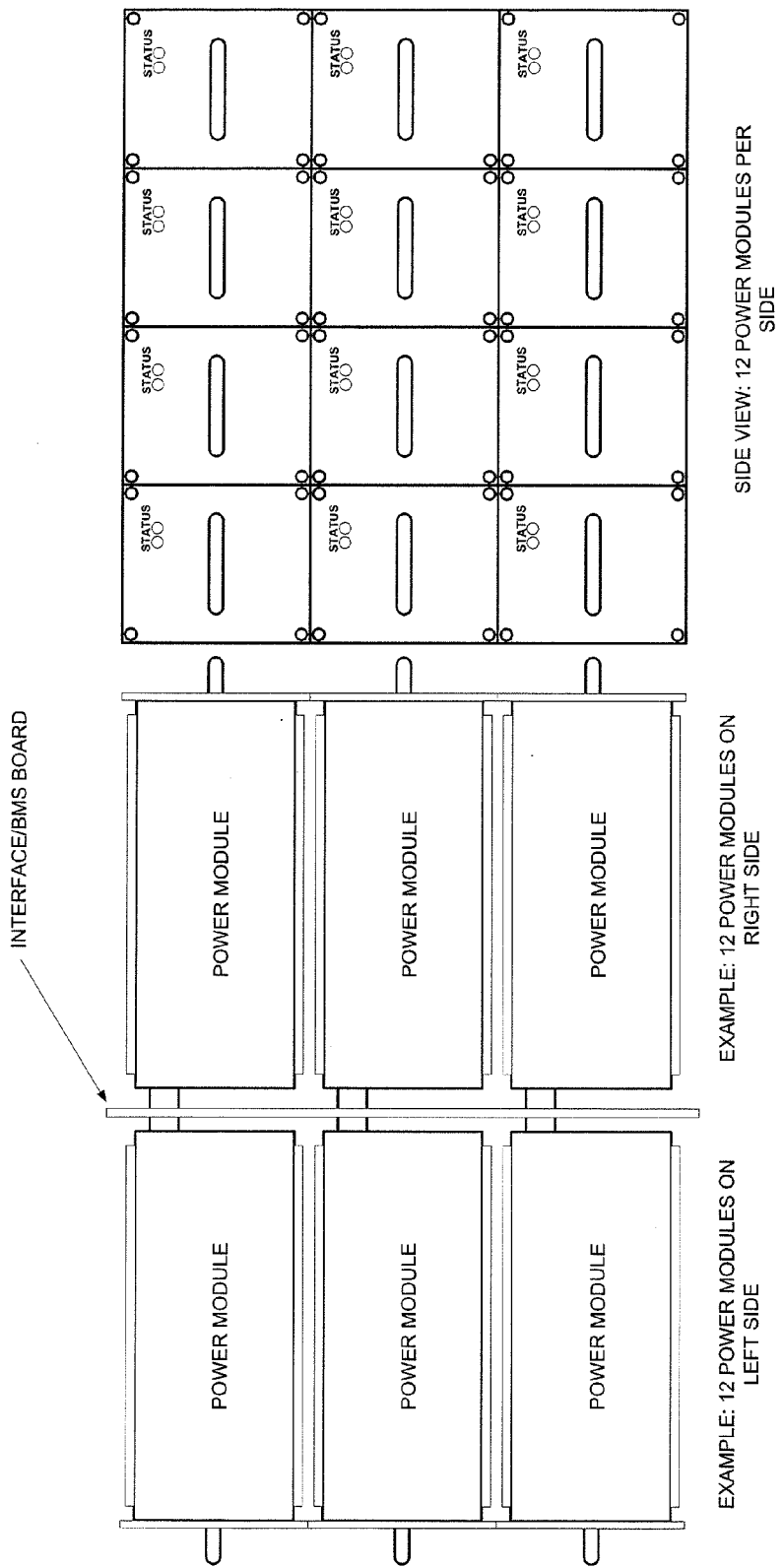
FIG. 5 illustrates one embodiment of battery and charger system interface/rack in accordance with one embodiment of the present invention.

Now referring to FIGS. 5a and 5b, a side view and a front view of a power module stack in accordance with one embodiment of the present invention may be seen. Referring first to FIG. 5b, it may be seen that the power modules are stacked so that each power module may be pulled out of the stack by the handle on the front of the power module. To maintain the position of the other power modules in the stack, a simple rack is provided, into which each power module may slide. When a power module slides into the rack, the connector at the back of the power module connects with a mating connector on an Interface/BMS Board behind the power module, as shown in FIG. 5a. In this stack, power modules are inserted into the rack from both sides of the Interface/BMS Board to provide an overall power module stack of 24 power modules. The Interface/BMS Board in this embodiment may be a printed circuit board, though separate cabling on the board would normally be used to carry the high current output of the power module.

Figure 6:
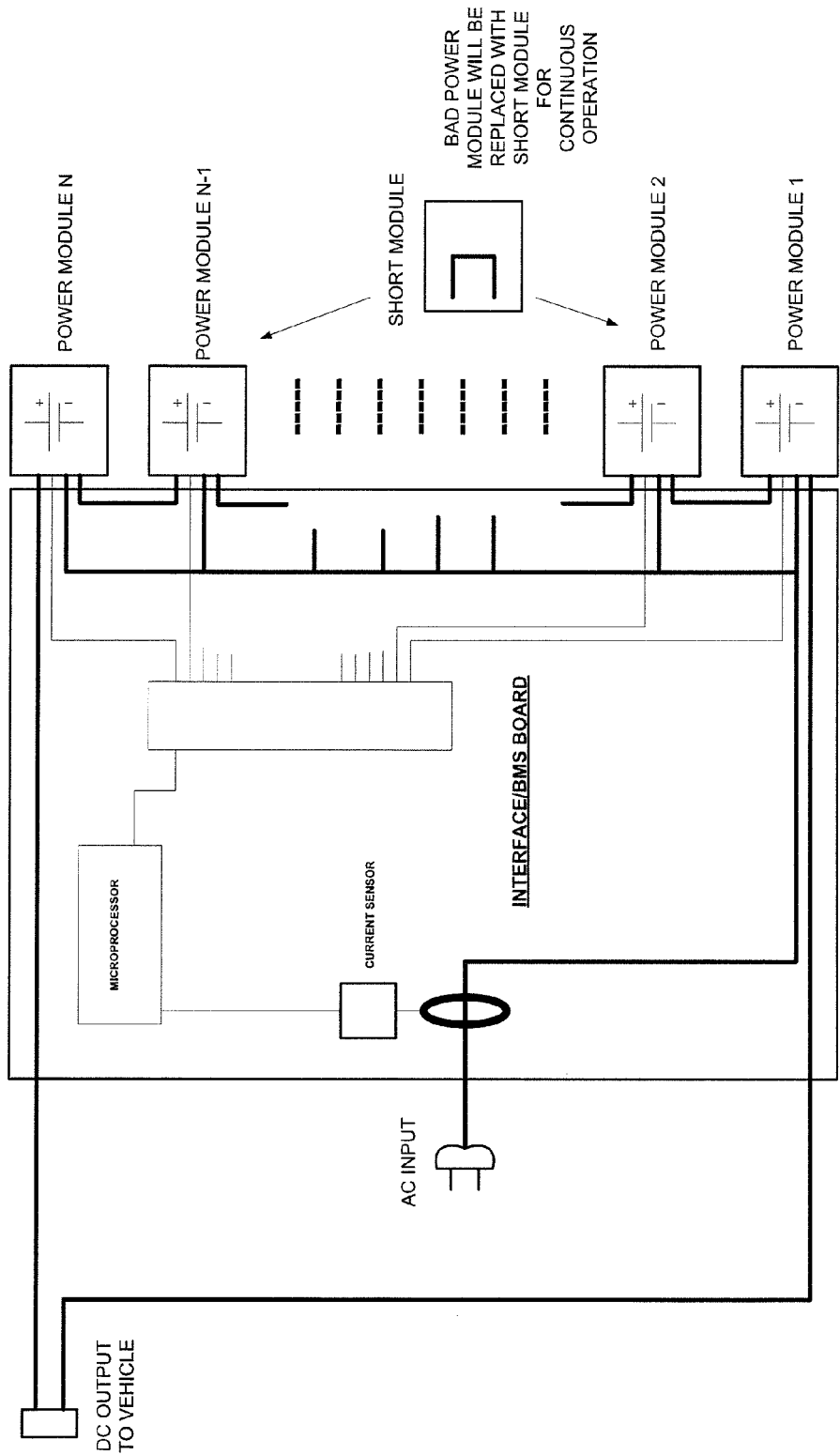
FIG. 6 is an overall battery and charger system diagram in accordance with one embodiment of the present invention.

Now referring to FIG. 6, a block diagram of the battery and charger system may be seen. In one embodiment a current sensor senses the current in the AC input power cord for input to the microprocessor in the Interface/BMS Board, which in turn controls the battery charger in each power module in accordance with the charging needs of each power module within a predetermined limit of the AC input current. In particular, a typical household 115 VAC outlet is coupled through a 20 amp circuit breaker, so that an appropriate 115 volt AC current limit for the system is approximately 15 amps to prevent inadvertent tripping of the circuit breaker. This will provide approximately 1725 watts of power, sufficient to operate a plurality of power module chargers at a high charging current rate, or even more and perhaps all chargers, at a low charging current rate.

FIG. 6 illustrates one of the principal advantages of the present invention. In particular, upon the failure of any one of the power modules, the bad power module may be individually removed from its rack and a shorting module may be inserted in its position, whose function is simply to directly connect the two connector terminals that theretofore were connected to the positive and negative terminals of the power module. This, of course, will reduce the storage capacity of the power module stack, but only by less than approximately 5% in the embodiment described, and will similarly detract from the performance of any vehicle powered thereby. However, the vehicle remains operative in all other respects, providing not only a "get home" capability, but further providing a usable vehicle for most purposes until such time as the faulty power module may be replaced. The faulty power module, of course, may be identified by the microprocessor by the characteristics of the terminal voltage of the faulty power module, its inability to accept a charge, its overheating when charging is attempted, etc., thereby eliminating the guesswork with respect to which power module failed.

Figure 7:
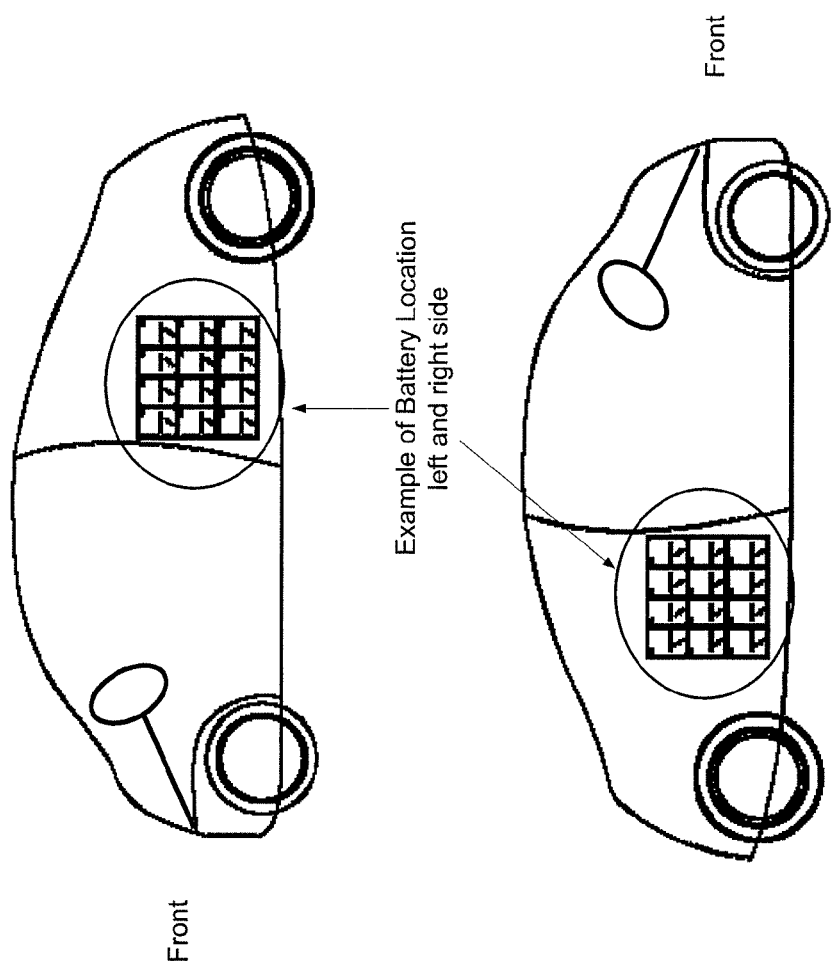
FIG. 7 is an illustration of an exemplary battery location in a battery powered or hybrid vehicle.

FIG. 7 illustrates another power module stack arrangement in a vehicle. Here a battery stack is placed at each side of the vehicle. In such an arrangement, the power modules would slide into a rack and plug into Interface/BMS board from both sides as shown in FIGS. 5a and 5b. In that regard, it should be noted that the relative length, width and height of the power module, as well as the absolute dimensions, may be selected based upon the nature of the space available and the power required. Further, while the handle is shown on the front panel in FIG. 4b, as is convenient for power module stacks as shown in FIGS. 5a and 5b and FIG. 7, power modules may be configured with the handle on the top thereof and the connector on the bottom thereof for location in a horizontal array, such as may be used under the floor of a vehicle, etc., or perhaps handles such as fold-away handles might be placed at two locations on a power module, such as on the front and top thereof.

Figure 8:
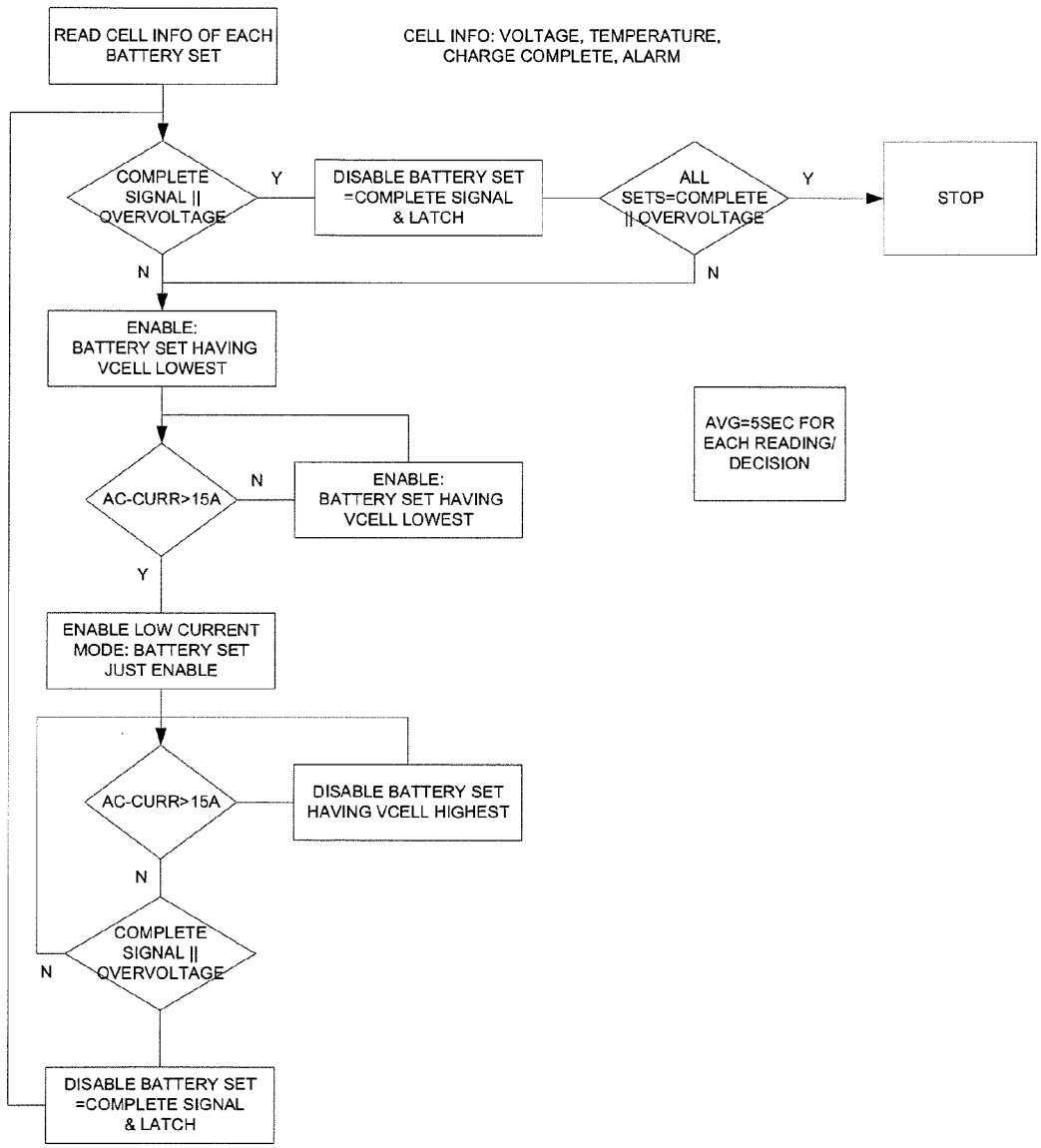
FIG. 8 presents an AC current management flowchart in accordance with one embodiment of the present invention.

Now referring to FIG. 8, an AC current management flow chart of the present invention may be seen. This flow chart would apply to the battery management system shown in FIGS. 2 and 3. When first turned on, the battery management system reads the cell information of each battery, namely, the voltage, temperature, battery type, charge count, whether the charge is complete and whether any alarms have been set. Actually, this is a constant process so that the battery management system always knows the state of each cell in each battery set (power module), the exemplary embodiment having four cells per battery set as previously noted.

Once all cells are read, the cells in each battery set are checked to see if each cell is complete (fully charged) or has a voltage exceeding a normal fully charged state. If all cells in a battery set are fully charged, that battery set is indicated as having the charging completed, providing a complete signal and latching the charger in that battery set off. If all sets of battery cells in all battery sets are indicating a complete charge or over voltage the sequence stops, though is reinitiated periodically (every 5 seconds in the embodiment being described) so as to promptly initiate charging if and when at least one or more battery cells are below a full charge. In particular, if on any repeat, one or more battery cells of one or more battery sets is found to not be fully charged, the battery management system will enable the battery charger in the battery set having the lowest cell voltage (Vcell). Then a determination is made as to whether the AC current exceeds 15 amps or not. In particular, since the exemplary embodiment merely plugs into a conventional 115 VAC receptacle, typically protected by a 20 amp circuit breaker, the AC current for the overall system is intentionally limited to 15 amps to prevent inadvertent tripping of the circuit breaker. Assuming the AC current is less than 15 amps, the charger in the battery set having the next lowest cell voltage is enabled and the AC current is again checked. If it is still less than 15 amps, the charger in the battery set having the cell with the lowest voltage not currently being charged is enabled and the AC current again checked. Note that once a charger in a battery set is enabled, the voltage on what was the lowest voltage cell may almost immediately significantly increase because of the impedance of the cell so that the same is not then the lowest cell voltage in the system.

Once the AC current is detected as exceeding 15 amps, the battery charger in the last battery set enabled is switched from the high current charging rate to the low current mode and the AC current is again checked. If the AC current is still above 15 amps the charger in the battery set currently being charged but having the highest cell voltage is disabled and the AC current is again checked. If it's still above 15 amps the disabling of the battery set having the highest cell voltage then currently being charged is disabled and the AC current again tested. Of course, as battery sets become fully charged, the chargers in the fully charged battery sets turn off, so that this loop continues until all battery sets are fully charged, after which time logic flow returns to the beginning.

Figure 9:
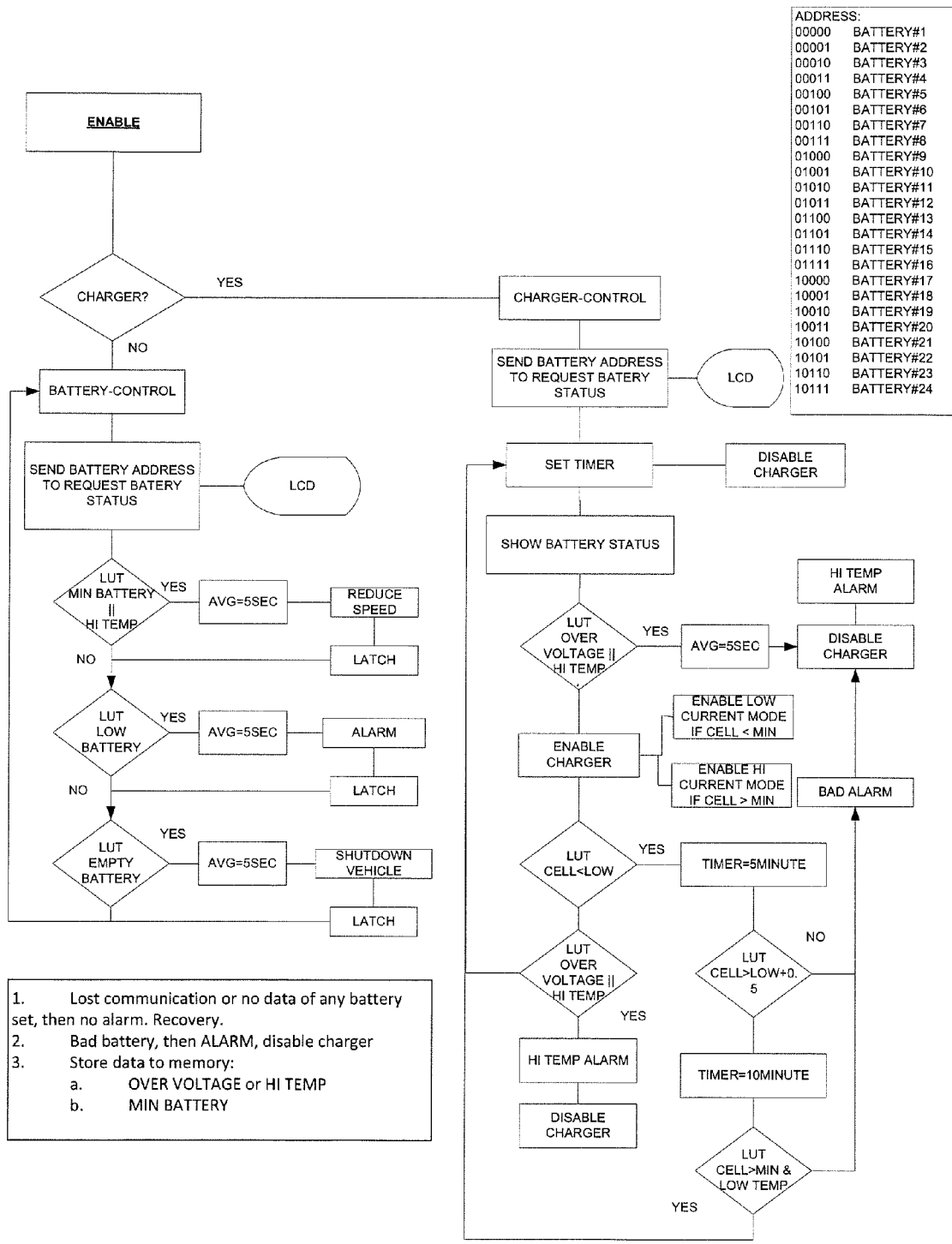
FIG. 9 presents a battery management system (BMS)/charger/battery control flowchart in accordance with one embodiment of the present invention.

Now referring to FIG. 9, an exemplary battery management system aboard a battery powered vehicle in accordance with the present invention may be seen. Once enabled, the first determination is whether the AC input (charger) is plugged into the vehicle or not. If it is not, then the battery management system switches to battery-control for vehicle speed, alarm, etc. The system sends out battery addresses to request the battery information (status) of each battery set and display the same on a liquid crystal display. Battery information is compared with lookup table to determine whether the combined battery voltage has fallen to what is referred to herein as a minimum battery voltage threshold or a battery cell has reached an excessively high temperature. If the minimum battery voltage or a high temperature has been reached for an average of 5 seconds, the top speed obtainable by the vehicle is reduced (stepped downward to a next controlled level) and latched in that condition. If, in fact, the battery voltage is substantially below the minimum battery voltage, referred to herein as a low battery voltage threshold, and the condition persists for 5 seconds, an alarm is given and a latch is set. If, on the other hand, the battery voltage indicates what is referred to herein as an empty battery threshold for a 5 second average, the vehicle is shut down and latched in that condition until the batteries are again charged.

If, on the other hand, it is found that the vehicle system is plugged into the AC power (charger), then the battery management system switches to the charger control in each battery set. The battery management system (FIGS. 2 and 3) sends a battery address to request the battery information (status), which is then displayed on an LCD display. The timer is then set, which sets a time within which battery charging should be complete, unless of course there is a bad battery or other fault in the system. The batteries' status is displayed and in each battery, if all cells are above the overcharge voltage threshold or a high temperature is encountered for more than 5 seconds, the charger is disabled, and if the high temperature was sensed a high temperature alarm is provided. When the charger in that battery is enabled by the battery management system, that charger in the battery will enable a low current charging mode for a cell if the cell voltage is below a minimum voltage threshold (a voltage below which a high charging current should not be used), and if the cell is above that minimum voltage threshold a high current charging mode is enabled. If a cell voltage in that battery set is below a low voltage threshold (the low voltage being lower than the minimum voltage) a timer is set, in this embodiment for a 5 minute period, after which the cell voltage is again tested. If the cell voltage is not above the low voltage threshold, indicating that that cell has not properly taken the charge provided to it during that 5 minute period, a bad cell alarm is provided and that charger disabled. If, however, after the 5 minute period the cell voltage is above the low voltage threshold, another timer is initiated, in this embodiment a 10 minute timer, and then the cell again tested. If, at that time, the cell voltage is above a minimum voltage threshold and the cell temperature is below a high temperature threshold, the loop returns. If, on the other hand, the battery cell voltage is below a minimum voltage threshold or battery cell temperature is above the high temperature threshold, the bad cell alarm is again set and the charger disabled, with the high temperature alarm being set if the low temperature was not sensed. If the cell is not fully charged, the loop returns.

The present invention has a number of advantages over the prior art. By putting the cell chargers in the battery sets (power modules), the step down transformers for the battery chargers are also in the power modules, providing the required DC isolation in a high voltage battery stack while also avoiding the required distribution of high charging currents to each of the batteries. The present invention also allows the positioning of any power module anywhere in a battery stack, and the removal of a bad power module and shorting out of its connections in the battery stack to maintain operation of the vehicle until the shorting module can be replaced with a properly functioning module. These are but a few of the advantages of the present invention. Thus the present invention has a number of aspects, which aspects may be practiced alone or in various combinations or sub-combinations, as desired. While a preferred embodiment of the present invention has been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A rechargeable battery system in an electric powered vehicle comprising:
    a power module in an electric powered vehicle including;
        a battery set having a plurality of battery cells connected in series between first and second power output terminals;
        a battery charger powered from an AC power line through a step down transformer in the rechargeable power module, the battery charger being controllable to selectively charge individual cells in the rechargeable power module based on the state of charge of each cell;
        a power module controller coupled to sense the voltage and the temperature of each cell and for communicating the voltage of each cell, the temperature of each cell and the battery type to a battery management system;
    the battery management system including;
        a connector for connecting to a source of power and coupling that source of power to the power module;
        a battery management controller coupled for communication with the power module controller to read the voltage of each cell, the temperature of each cell and the battery type, and to enable the battery charger for charging the cells in the power module;
    wherein the battery management system is programmed to monitor the voltage on the first and second power output terminals when the battery management system is not plugged into a source of power, and to reduce the top speed of the vehicle if the voltage on the first and second power output terminals decreases to a minimum voltage threshold, and to shut down the vehicle if the voltage on the first and second power output terminals reduces to an empty battery threshold.

2. The rechargeable battery system of claim 1 wherein the battery management system is programmed to monitor the cell temperature when the battery management system is not plugged into a source of power, and to reduce the top speed of the vehicle if the cell temperature equals or exceeds a predetermined high temperature.

3. The rechargeable battery system of claim 1 wherein the top speed of the vehicle is reduced or the vehicle is shut down only if the average respective voltage on the first and second power output terminals meets the respective condition for a predetermined time period.

4. The rechargeable battery system of claim 3 wherein the top speed of the vehicle is reduced or the vehicle is shut down only if the average combined voltage meets the respective condition for a predetermined time period.

5. The rechargeable battery system of claim 3 wherein an is given if the voltage on the first and second power output terminals decreases to a low battery voltage threshold, the low battery voltage threshold being a voltage between the minimum voltage threshold and the empty battery threshold.

6. The rechargeable battery system of claim 5 wherein the alarm is given only if the voltage on the first and second power output terminals decreases to a low battery voltage threshold for an average of a predetermined time period.

7. A rechargeable battery system in an electric powered vehicle comprising:
a plurality of power modules, each including;
    a battery set having a plurality of battery cells connected in series between first and second power output terminals;
    a battery charger powered from an AC power line through a step down transformer in the rechargeable power module, the battery charger being controllable to selectively charge individual cells in the rechargeable power module based on the state of charge of each cell;
    a power module controller coupled to sense the voltage and the temperature of each cell and for communicating the voltage of each cell, the temperature of each cell and the battery type to a battery management system;
    the first and second power output terminals of the plurality power modules being connected in series;
and a battery management system including;
    a connector for connecting to a source of power and coupling that source of power to each of the power modules;
    a battery management controller coupled for communication with each of power module controllers to read the voltage of each cell, the temperature of each cell and the battery type, and to enable the battery charger for charging of the cells in the respective power module;
    wherein the battery management system is programmed to monitor the combined voltage of the plurality of power modules when the battery management system is not plugged into a source of power, and to reduce the top speed of the vehicle if the combined voltage of the power modules decreases to a minimum voltage threshold, and to shut down the vehicle if the combined voltage of the power modules further reduces to an empty battery threshold.

8. The rechargeable battery system of claim 7 wherein the battery management system is programmed to detect a faulty power module, which faulty power module may be removed and replaced with a shorting module to short out the respective connections in the series connection of the plurality power modules.

9. The rechargeable battery system of claim 7 wherein an alarm is given if the combined voltage decreases to a low battery voltage threshold, the low battery voltage threshold being a voltage between the minimum voltage threshold and the empty battery threshold.

10. The rechargeable battery system of claim 9 wherein the minimum voltage threshold, the low battery voltage threshold and the empty battery threshold for various battery types are stored in look-up tables.

11. The rechargeable battery system of claim 9 wherein the alarm is given only if the average combined voltage decreases to a low battery voltage threshold for a combined voltage a predetermined time period.

12. The rechargeable battery system of claim 9 wherein when the battery management system is plugged into a source of power, the battery management system determines which power module has the lowest cell voltage and enables the charger in that power module.

13. The rechargeable battery system of claim 12 wherein once the charger in a power module is enabled, the controller in the power module determines the cells and cell charging rates to be used.

14. The rechargeable battery system of claim 12 wherein the battery management system monitors the current received from the power source, and enables additional chargers in additional power modules until the current received from the power source exceeds a predetermined limit, after which the last charger enabled is switched to a lower charging rate.

15. The rechargeable battery system of claim 14 wherein if the current received from the power source still exceeds a predetermined limit after which the last charger enabled is switched to a lower charging rate, then after the last charger is switched to a lower charging rate, the charger that is enabled and has the highest cell voltages is disabled.

16. The rechargeable battery system of claim 9 having a circuit board having:
    the connector for connecting to a source of power and power lines for coupling that source of power to each of the power modules;
    the battery management controller;
    plugs and signal lines for connecting to the power module controllers to the battery management controller;
    output power lines and plugs to connect the first and second power output terminals of the plurality power modules in series;
    each power module being capable of plugging into any power module position in the circuit board.

17. The rechargeable battery system of claim 16 wherein any power module may be replaced by a shorting module having its first and second power output terminals shorted together without effecting the functioning of other power modules plugged into the circuit board.

* * * * *